United States Patent
Tanaka (10) Patent No.: US 9,604,501 B2
(45) Date of Patent: Mar. 28, 2017

(54) PNEUMATIC TIRE

(71) Applicant: Sumitomo Rubber Industries, Ltd., Kobe-shi, Hyogo (JP)

(72) Inventor: Susumu Tanaka, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 341 days.

(21) Appl. No.: 14/204,328

(22) Filed: Mar. 11, 2014

(65) Prior Publication Data

US 2014/0261952 A1 Sep. 18, 2014

(30) Foreign Application Priority Data

Mar. 12, 2013 (JP) ................................. 2013-049486

(51) Int. Cl.
| | | |
|---|---|---|
| *B60C 9/18* | (2006.01) | |
| *B60C 9/22* | (2006.01) | |
| *B60C 9/28* | (2006.01) | |
| *B60C 9/30* | (2006.01) | |
| *B60C 9/20* | (2006.01) | |

(52) U.S. Cl.
CPC .............. *B60C 9/18* (2013.01); *B60C 9/2009* (2013.04); *B60C 2009/2223* (2013.04); *B60C 2009/2233* (2013.04); *B60C 2009/2295* (2013.04); *Y10T 152/10801* (2015.01)

(58) Field of Classification Search
CPC .... B60C 9/18; B60C 9/20; B60C 9/22; B60C 9/2204; B60C 9/28; B60C 9/30
See application file for complete search history.

(56) References Cited

U.S. PATENT DOCUMENTS

2010/0319825 A1 12/2010 Yoshinaka et al.

FOREIGN PATENT DOCUMENTS

| DE | 4209817 | * | 9/1993 |
| EP | 600398 | * | 6/1997 |
| JP | 2009-137495 A | | 6/2009 |

OTHER PUBLICATIONS

Machine translation of DE 4209817, 1993.*
Machine translation of EP 600398, 1997.*

* cited by examiner

*Primary Examiner* — Justin Fischer
(74) *Attorney, Agent, or Firm* — Birch, Stewart, Kolasch & Birch, LLP (57) ABSTRACT

A pneumatic tire whose mounting location on a vehicle is specified and which comprises a belt disposed radially outside the carcass and composed of belt cords laid at an angle of from 15 to 40 degrees with respect to the tire circumferential direction, and a band disposed radially outside the belt and composed of first and second band cords laid at an angle of not more than 5 degrees with respect to the tire circumferential direction. The band comprises an inboard first part composed of the first band cord having a first modulus M1, and an outboard second part composed of the second band cord having a second modulus M2 more than the first modulus M1. The number of laminated plies of the band in the inboard first part is more than the number of laminated plies or a single ply of the band in the outboard second part.

19 Claims, 5 Drawing Sheets

PNEUMATIC TIRE

BACKGROUND OF THE INVENTION

The present invention relates to a pneumatic tire, more particularly to an asymmetric tread reinforcing structure capable of improving high-speed durability, without sacrificing ride comfort.

In general, a radial tire for high speed running is provided in the tread portion with a belt (cross-ply breaker) for reinforcing the tread portion and a radially outer band for preventing the belt from lifting to provide high-speed durability for the tire.

In recent years, in order to improve the high-speed durability, such a band is formed by winding a high-modulus organic fiber cord or cords across the entire width of the radially inner belt structure. In such tire structure, however, due to the high modulus organic fiber cord band, ride comfort is liable to deteriorate.

On the other hand, Japanese Patent Application Publication No. P2009-137495A (corresponding to United States Patent Application Publication No. US2010-319825A1) discloses a pneumatic tire provided with a narrow single-ply band made of a high modulus cord and a wide single-ply band made of a low modulus cord which are disposed side-by-side on the radially outside of a tread reinforcing belt. In such tire structure, however, there is room for improvement from a point of view of simultaneous pursuit of ride comfort and high-speed durability.

SUMMARY OF THE INVENTION

It is therefore, an object of the present invention to provide a pneumatic tire, in which high-speed durability is improved, without sacrificing ride comfort, by employing an asymmetric tread reinforcing structure associated with the tire mounting location on a vehicle.

According to the present invention, a pneumatic tire whose mounting location on a vehicle is specified, comprises:
 a carcass extending between bead portions through a tread portion and sidewall portions,
 a belt disposed radially outside the carcass in the tread portion, and composed of belt cords laid at an angle of from 15 to 40 degrees with respect to the tire circumferential direction, and
 a band disposed radially outside the belt, and composed of first and second band cords laid at an angle of not more than 5 degrees with respect to the tire circumferential direction, wherein
 the band comprises an inboard first part composed of the first band cord having a first modulus M1 and to be positioned close to the center of a vehicle body, and
 an outboard second part composed of the second band cord having a second modulus M2 more than the first modulus M1 and to be positioned away from the center of the vehicle body, and
 the number of laminated plies of the band in the inboard first part is more than the number of laminated plies or a single ply of the band in the outboard second part.

Preferably, the ratio M2/M1 of the second modulus M2 to the first modulus M1 is 1.2 to 7.0.
Preferably, the second modulus M2 is 42.0 to 77.0 centinewton/dtex, and the first modulus M1 is 17.0 to 21.5 centinewton/dtex.
Preferably, the second band cord is an aramid fiber cord, and the first band cord is a nylon fiber cord.

Preferably, the band ply number in the inboard first part is 2, and the band ply number in the outboard second part is 1.
Preferably, the axial width W2 of the outboard second part is less than the axial width W1 of the inboard first part.
Preferably, the cord count of the or each band ply in the outboard second part is the same as the cord count of the or each band ply in the inboard first part.
Preferably, the land ratio of one half of the tread portion on the outboard side of the tire equator is more than the land ratio of the other one half of the tread portion on the inboard side of the tire equator, and
the tread portion is provided on each side of the tire equator with an axially outermost, circumferentially continuously extending main groove so as to define a shoulder land portion axially outside the main groove, and the axial width W4 of the outboard shoulder land portion is more than the axial width W3 of the inboard shoulder land portion.

According to the present invention, as the internal structure of the tire is of left-right asymmetry (asymmetry about the tire equator), the mounting location of the tire on a vehicle is specified (namely, the inboard side and outboard side of the tire are specified). Thus, the tire has an outboard tread edge and an outboard sidewall portion to be positioned away from the center of the vehicle body, and an inboard tread edge and an inboard sidewall portion to be positioned close to the center of the vehicle body. For example, the outboard sidewall portion is provided with an indication such as "outside", and the inboard sidewall portion is provided with an indication such as "inside".

According thereto, in this application, the terms "outboard" and "inboard" are used toward the outboard tread edge/sidewall portion and inboard tread edge/sidewall portion, respectively, to refer relative positions in the tire axial direction.

The terms "axially inner", "axially inward" and the like are used toward the tire equator, and
the terms "axially outer", "axially outward" and the like are used toward the tread edge in order to refer relative positions in the tire axial direction.

The tread edges Te are the axial outermost edges of the ground contacting patch which occurs under the normally inflated loaded condition when the camber angle of the tire is zero.

The tread width TW is the width measured under the normally inflated unloaded condition, as the axial distance between the tread edges Te determined as above.

Here, the normally inflated unloaded condition is such that the tire is mounted on a standard wheel rim and inflate to a standard pressure but loaded with no tire load.

The normally inflated loaded condition is such that the tire is mounted on the standard wheel rim and inflated to the standard pressure and loaded with the standard tire load. The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load Capacity" in ETRTO, the maximum value given in the above-mentioned table in TRA or the like.

In this application including specification and claims, various dimensions, positions and the like of the tire refer to those under the normally inflated unloaded condition of the tire unless otherwise noted.

DESCRIPTION OF THE PREFERRED EMBODIMENTS

Embodiments of the present invention will now be described in detail in conjunction with accompanying drawings.

Figure 1:
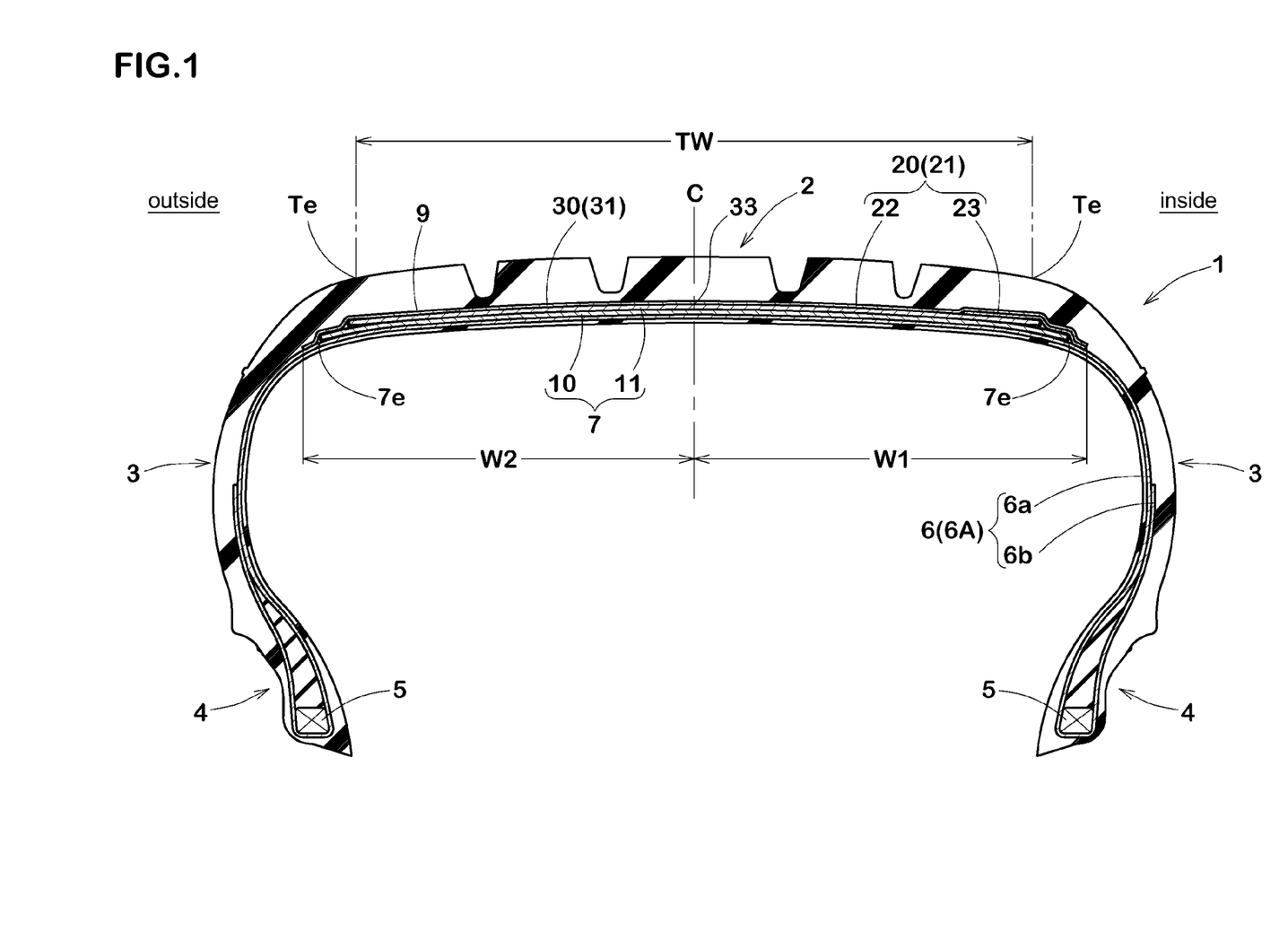
FIG. 1 is a cross sectional view of a pneumatic tire as an embodiment of the present invention.

According to the present invention, pneumatic tire 1 comprises a tread portion 2, a pair of axially spaced bead portions 4 each with a bead core 5 therein, a pair of sidewall portions 3 extending between the tread edges Te and the bead portions 4, a carcass 6 extending between the bead portions 4, a belt 7 disposed radially outside the carcass 6 in the tread portion 2, and a band 9 disposed radially outside the belt 7.

In the following embodiments, the pneumatic tire 1 is designed as a radial tire for passenger cars.

The carcass 6 is composed of at least one ply 6A of cords arranged radially at an angle in the range of from 70 to 90 degrees with respect to the tire equator C. The carcass ply 6A is extended between the bead portions 4 through the tread portion 2 and sidewall portions 3 and turned up around the bead core 5 in each bead portion 4 from the axially inside to the axially outside of the tire to form a pair of turnup portions 6b and a main portion 6a therebetween. In this example, the carcass 6 is composed of a single ply 6A of cords arranged radially at an angle of 90 degrees with respect to the tire equator C. For example, organic fiber cords, e.g. nylon, polyester, aromatic polyamide, rayon and the like can be used as the cords of the carcass ply 6A.

The belt 7 is composed of a radially inner ply 10 and a radially outer ply 11 disposed thereon.

Figure 2:
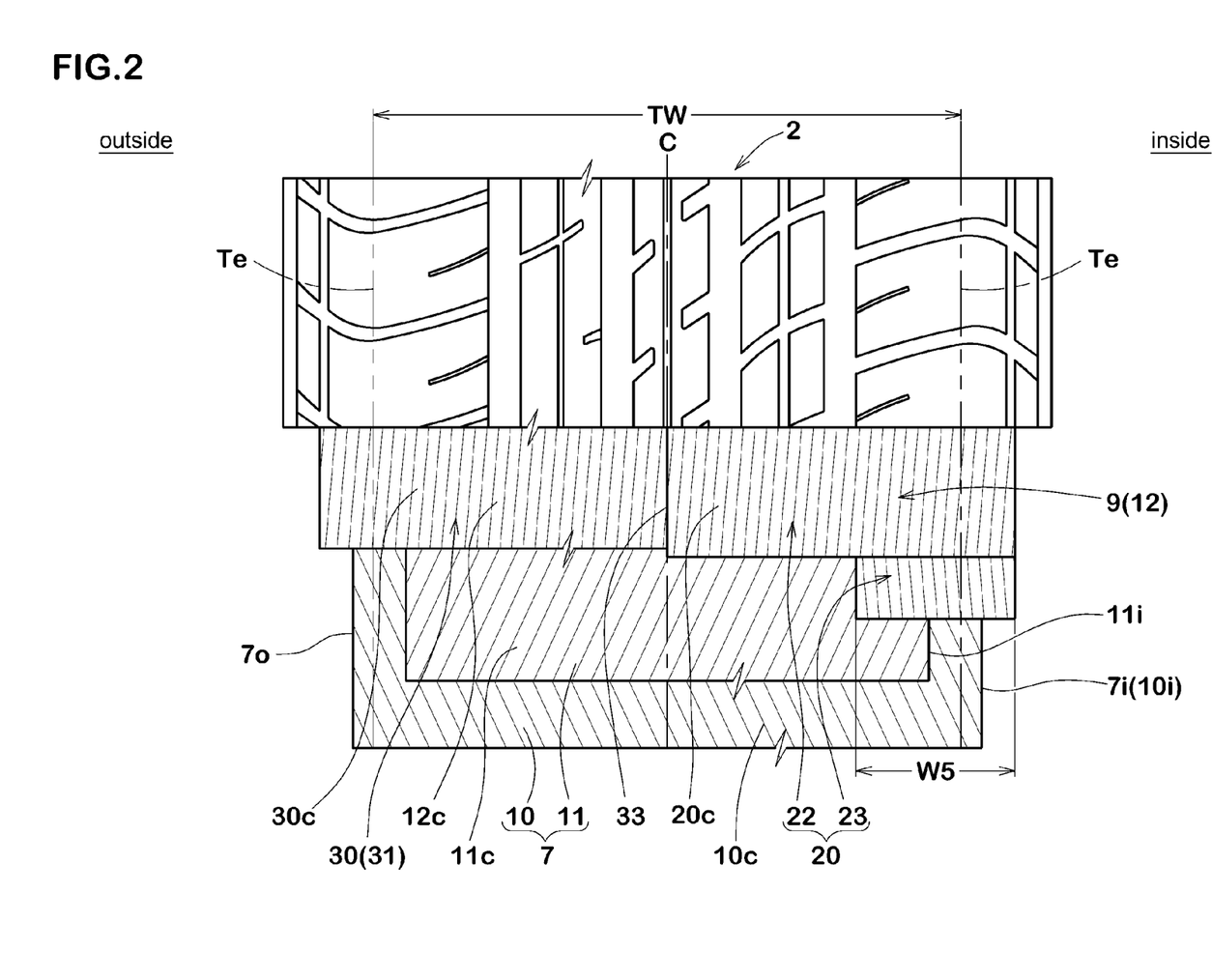
FIG. 2 is a partially cutaway, developed partial plan view of the pneumatic tire showing the tread portion and an arrangement of the belt cords and band cords.

As shown in FIG. 2, the radially inner belt ply 10 is composed of cords 10c laid parallel with each other. The radially outer belt ply 11 is composed of cords 11c laid parallel with each other so as to cross the belt cords 10c. For example, steel cords can be used as the belt cords 10c and 11c.

In order to reinforce the entire width of the tread portion, both edges 7e of the belt 7 in the tire axial direction (in this example, those of the widest ply 10) are positioned axially outside the respective tread edges Te.

The band 9 is composed of a plurality of plies 12 each composed of at least one cord 12c whose angle with respect to the tire circumferential direction is not more than 5 degrees. In this example, the band cord(s) 12c embedded in topping rubber in the form of a tape or a narrow width strip, is spirally wound on the outside of the belt 7 to form the band ply 12.

As to the band cords 12c, organic fiber cords, e.g. nylon, rayon, PEN, aramid and the like can be used.

In each of the band plies, the cord count of the band cord(s) 12c is 35 to 45 per 5 cm width.

The band 9 comprises a first part 20 composed of the first band cord 20c(12c) having a first modulus M1, and a second part 30 composed of the second band cord 30c(12c) having a second modulus M2 higher than the first modulus M1. The first part 20 is positioned on the inboard side of the tire equator C. The second part 30 is positioned on the outboard side of the tire equator c.

In this invention, the term "modulus" of the cord means the tensile strength (centinewton per dtex) of the cord.

Increasing the modulus of the band cord has greater effect on the improvement in the high-speed durability than increasing the number of laminated band plies of a low modulus cord. According to the present invention, therefore, in order to improve the high-speed durability, the band 9 is constructed so that its binding force is increased in the outboard area of the tread portion 2 subjected to relatively high ground pressure during high speed cornering. The majority of passenger cars have tires mounted with negative camber, therefore, during straight running, such tire is relatively increased in the ground pressure in the inboard area of the tread portion 2. Therefore, even if the modulus of the band cord is increased in the outboard area of the tread portion 2, it will be hardly exert a negative effect on the ride comfort during straight running.

Preferably, the ratio M2/M1 of the second modulus M2 to the first modulus M1 is set in a range of not less than 1.2, more preferably not less than 2.0, but not more than 7.0, more preferably not more than 6.0.

If the ratio M2/M1 is less than 1.2, there is a possibility that the high-speed durability can not be fully improved. If the ratio M2/M1 is more than 7.0, a large difference in the rigidity occurs in the tread portion 2, and there is a possibility that the durability of the tire is decreased.

Preferably, the second modulus M2 is set in a range of not less than 42.0 centinewton/dtex, more preferably not less than 55.0 centinewton/dtex, but not more than 77.0 centinewton/dtex, more preferably not more than 65.0 centinewton/dtex in order that the second part 30 exerts excellent high-speed durability without sacrificing the ride comfort. Preferably, the first modulus M1 is set in a range of not less than 17.0 centinewton/dtex, more preferably not less than 18.5 centinewton/dtex, but not more than 21.5 centinewton/dtex, more preferably not more than 20.0 centinewton/dtex. If the first modulus M1 is less than 17.0 centinewton/dtex, there is a possibility that the high-speed durability and the steering stability are deteriorated. If the first modulus M1 is more than 21.5 centinewton/dtex, there is a possibility that the ride comfort is deteriorated.

The number of the laminated band plies in the first part 20 is more than the number of the laminated band plies or single band ply in the second part 30. Preferably, the difference therebetween is 1 or 2.

Increasing the number of laminated band plies of a low modulus cord exerts less negative effect on the ride comfort in comparison with increasing the modulus of the band cord. As explained above, during straight running, the ground pressure in the inboard area of the tread portion 2 is relatively increased, therefore, the increasing of the number of band plies in the first part 20 can improve the high-speed durability, without sacrificing the ride comfort.

If the difference in the band ply number is more than 2, a large difference in the rigidity occurs in the tread portion 2, and there is a possibility that the ride comfort and the steering stability are deteriorated.

In this example, the first part 20 is formed by two laminated band plies, namely, a radially inner first band ply 23 and a wider radially outer first band ply 22 disposed thereon. The radially outer first band ply 22 extends from the tire equator C to a position beyond the inboard edge 7i of the belt 7 to cover one half of the belt 7 on the inboard side of the tire equator C.

The radially inner first band ply 23 covers the inboard edge 10i of the radially inner belt ply 10 and the inboard edge 11i of the radially outer belt ply 11.

Preferably, the axial width W5 of the radially inner first band ply 23 is set in a range of not less than 0.20 times, more preferably not less than 0.23 times, but not more than 0.30 times, more preferably not more than 0.27 times the tread width TW in order that the radially inner first band ply 23 can prevent damage starting from the edges of the radially inner belt ply 10 and radially outer belt ply 11, without excessively increasing the rigidity in the inboard area of the tread portion 2.

on the other hand, the second part 30 in this example is formed by a second band ply 31 only.

The second band ply 31 extends from the tire equator C to a position beyond the outboard edge 7o of the belt 7 to cover the other one half of the belt 7 on the outboard side of the tire equator C.

In this example, the boundary 33 between the first part 20 and the second part 30 is positioned at the tire equator C. But, it may be deviated away from the tire equator C toward the inboard side or outboard side thereof.

Further, the first part 20 and the second part 30 may be spaced apart from each other in the vicinity of the tire equator C.

In either case, it is preferable that the axially inner edges of the first part 20 and the second part 30 are positioned in the vicinity of the tire equator. For example, the axial distance of each of the axially inner edges from the tire equator is less than about 5% of the tread width TW, or within the axial width of a center rib or block if such tread element is provided.

If the axial width W2 of the second part 30 is more than the axial width W1 of the first part 20, as the amount of the band cord having a relatively high modulus is increased, there is a possibility that the ride comfort is deteriorated. Therefore, the axial width W2 may be less than the axial width W1 as shown in FIG. 1. In view of the ride comfort, it is preferable that the ratio W2/W1 of the axial width W2 to the axial width W1 is not more than 0.90, more preferably not more than 0.70. But, if the ratio W2/W1 is decreased, there is a possibility that the durability of the tread portion 2 in the outboard area is decreased. Therefore, the ratio W2/W1 is preferably not less than 0.20, more preferably not less than 0.50.

It is preferable that the cord count of the or each band ply in the second part 30 is the same as the cord count of the or each band ply in the first part 20 in order not to deteriorate the tire uniformity, and also in order to improve the production efficiency of the tire.

Figure 3:
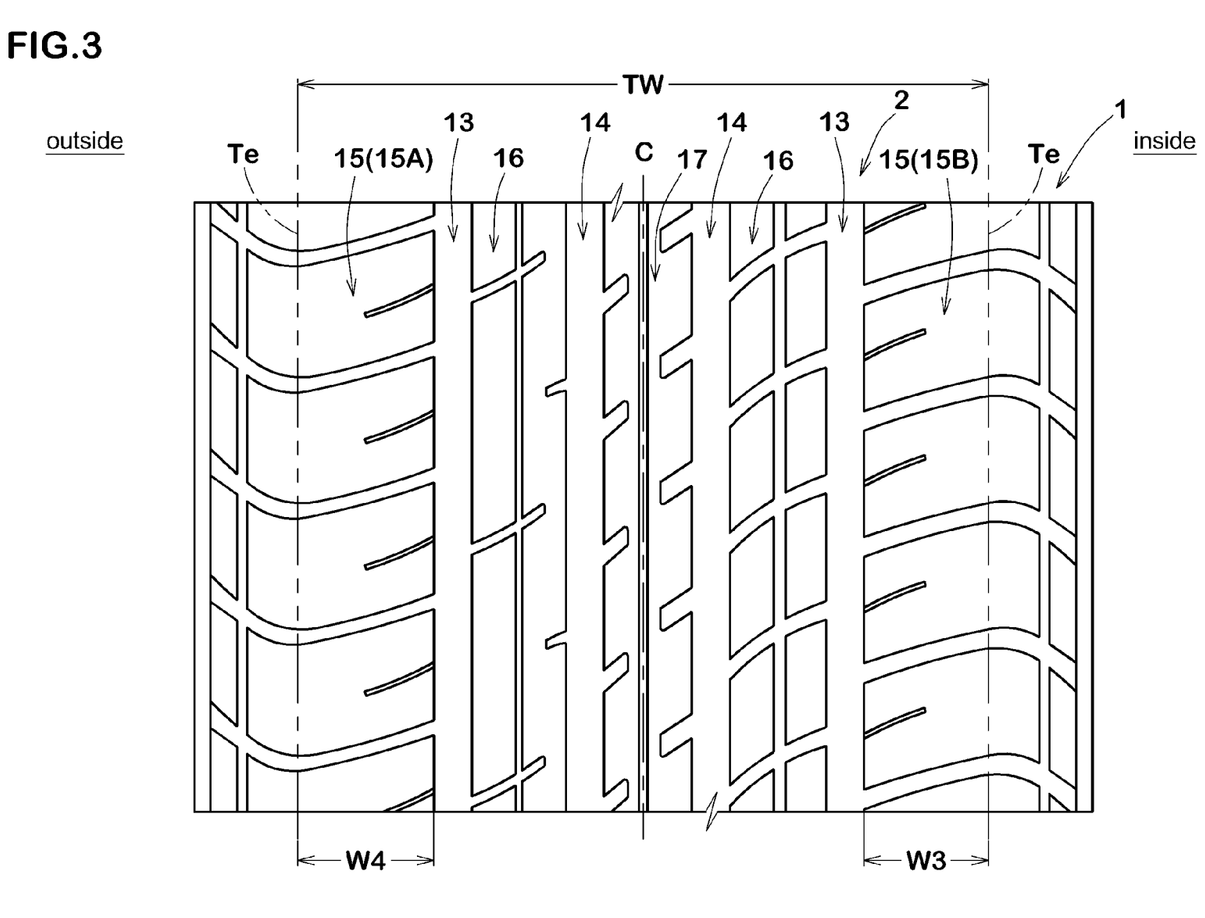
FIG. 3 is developed partial plan view of the pneumatic tire showing the tread portion
Figure 4:
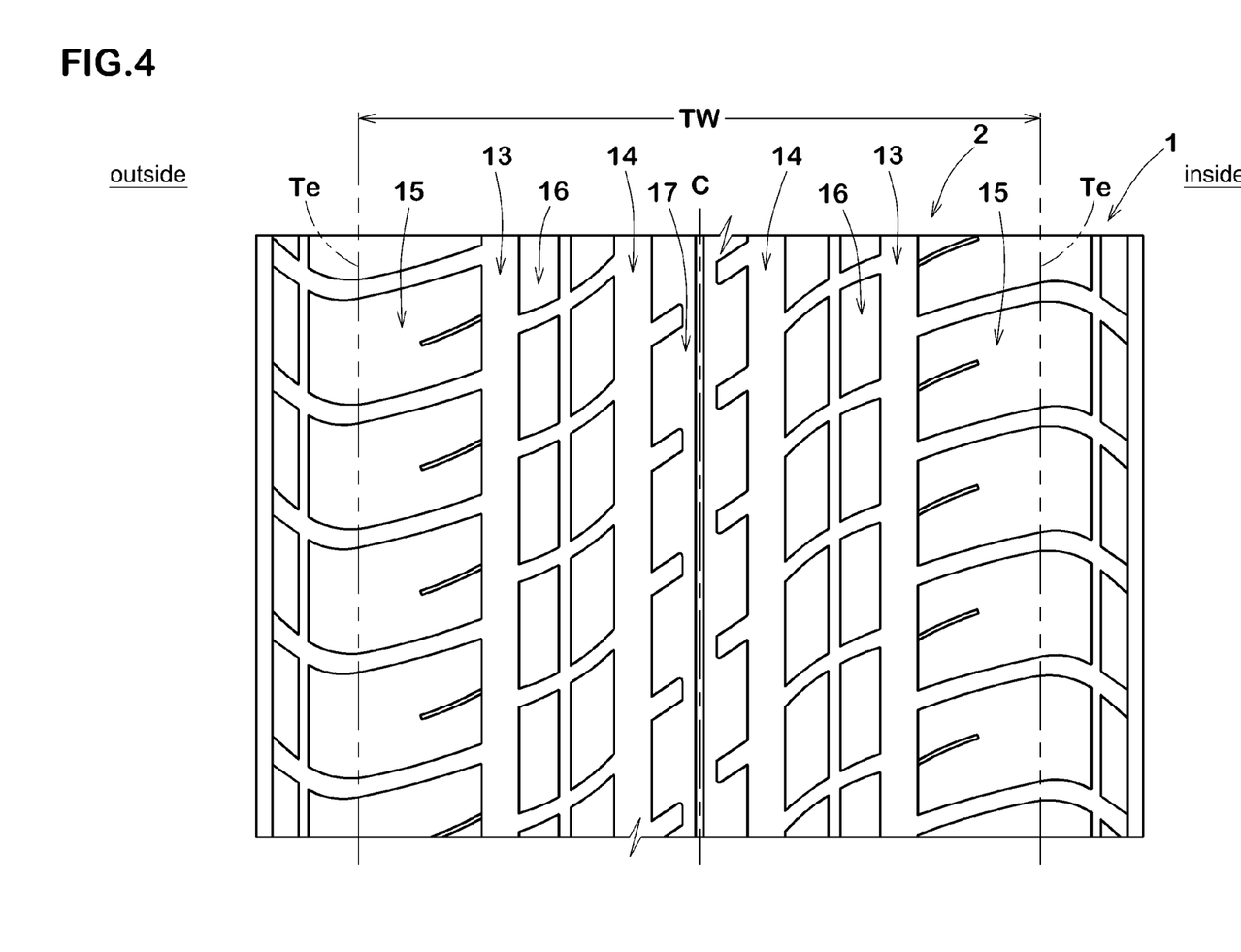
FIG. 4 is developed partial plan view of a pneumatic tire as another embodiment of the present invention.
Figure 5:
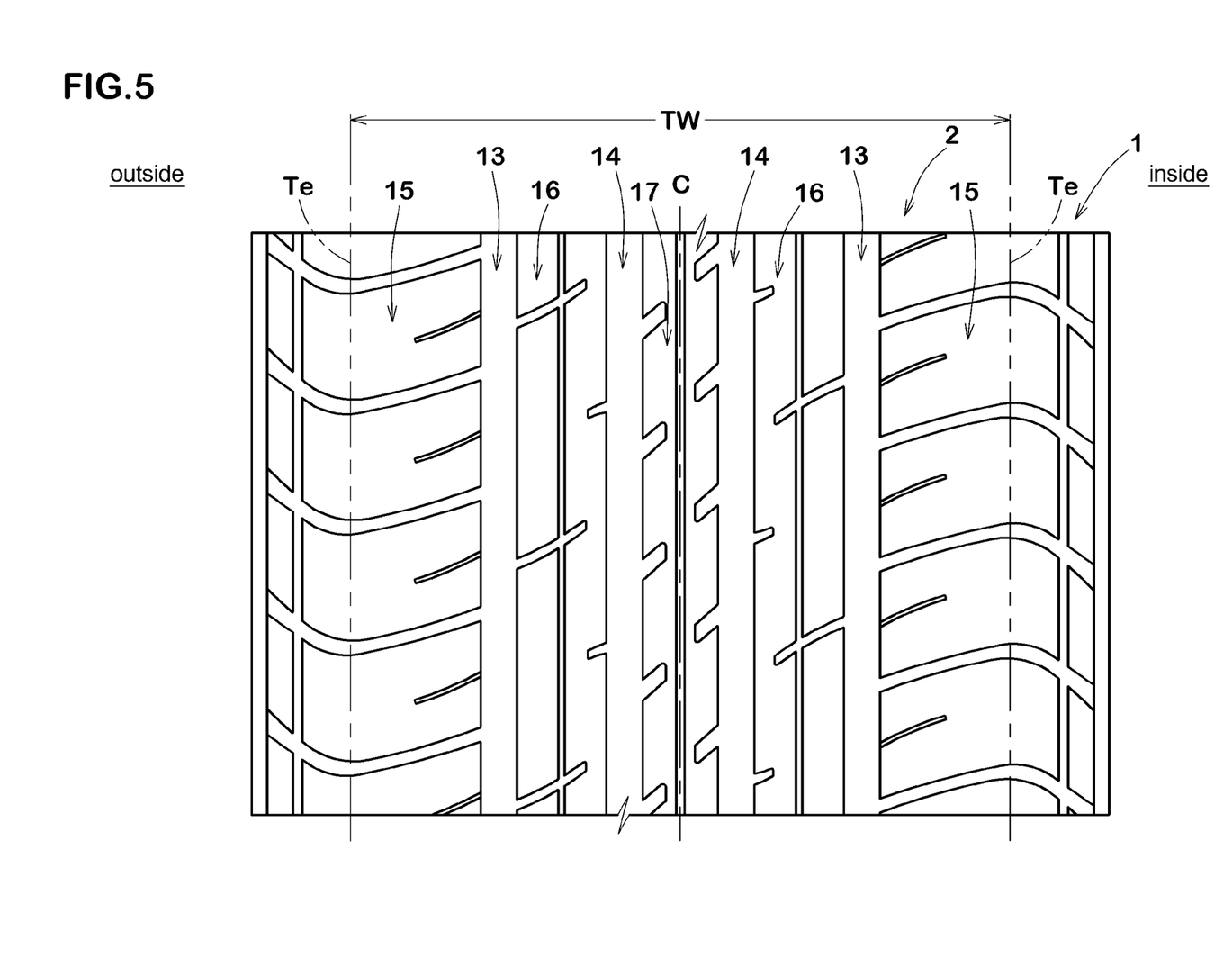
FIG. 5 is developed partial plan view of a pneumatic tire as another embodiment of the present invention.

By the way, the tread portion 2 is provided with circumferentially continuously extending main grooves which are, as shown in FIG. 3, a pair of crown main grooves 14 disposed one on each side of the tire equator C, and a pair of axially outermost shoulder main grooves 13 disposed axially outside the respective crown main grooves 14. Therefore, the tread portion 2 is divided into a pair of shoulder land portions 15 axially outside the shoulder main grooves 13, a pair of middle land portions 16 between the shoulder main grooves 13 and the crown main grooves 14, and a central land portion 17 between the crown main grooves 14.

If the pattern rigidity in the outboard area of the tread portion 2 is high, the high-speed durability may be improved. Therefore, the land ratio L2 of one half of the tread portion 2 on the outboard side of the tire equator C is set to be larger than the land ratio L1 of the other one half of the tread portion 2 on the inboard side of the tire equator C. Here, the land ratio is the ratio of the ground contacting area of the part concerned to the overall area of the part concerned. Preferably, the ratio L2/L1 of the land ratio L2 to the land ratio L1 is set in a range of not less than 1.03, more preferably not less than 1.05, but not more than 1.20, more preferably not more than 1.15.

If the ratio L2/L1 is less than 1.03, there is a possibility that the above-mentioned advantageous effects can not be obtained. If the ratio L2/L1 is more than 1.15, there is a possibility that uneven wear occurs in the inboard area of the tread portion 2.

For similar reasons, it is preferable that the axial width W4 of the outboard shoulder land portion 15A is more than the axial width W3 of the inboard shoulder land portion 15B. The ratio W4/W3 of the width W4 to the width W3 is Preferably set in a range of not less than 1.05, more preferably not less than 1.07, but not more than 1.25, more preferably not more than 1.20 in order that the shoulder land portions 15 can exert excellent high-speed durability without sacrificing the ride comfort.

Thus, the tread pattern is also asymmetric about the tire equator C.

Comparison Tests

Pneumatic tires of size 205/55R16 (rim size 16×6.533) having the internal structure shown in FIG. 1 and specifications shown in Table 1 were prepared and tested for the ride comfort and high-speed durability. In the tests, the tire pressure was 230 kPa.

<Ride Comfort Test>

The test tires were installed on the four wheels of a test car (2000 cc front-wheel-drive passenger car), and the test driver evaluated the ride comfort during the test car was running on a tire test road. The results are shown in Table 1, wherein the larger the value, the better the ride comfort.

<High-Speed Durability Test (Outboard)>

In a test circuit course, the test car was run until the outboard half of the tread portion was damaged, and the number of laps was counted. The results are indicated in Table 1 by an index based on Ref. 1 being 100, wherein the larger the index, the better the high-speed durability.

<High-Speed Durability Test (Inboard)> using a tire test drum, the test tire mounted with a camber angle of −3 degrees was run until the inboard half of the tread portion was damaged to obtain the accumulated running distance. The results are indicated in Table 1 by an index based on Ref. 1 being 100, wherein the larger the index, the better the high-speed durability.

From the test results, it was confirmed that the tires according to the present invention can be improved in the ride comfort and high-speed durability.

TABLE 1

| Tire | Ref. 1 | Ref. 2 | Ref. 3 | Ref. 4 | Ex. 1 | Ex. 2 | Ex. 3 | Ex. 4 |
|---|---|---|---|---|---|---|---|---|
| tread pattern (Fig. No.) | 5 | 5 | 5 | 4 | 5 | 5 | 5 | 5 |
| first part | | | | | | | | |
| number of band ply | 2 | 1 | 1 | 2 | 2 | 2 | 2 | 2 |
| band cord material | nylon | nylon | PEN | nylon | nylon | nylon | nylon | nylon |
| band cord modulus M1 | 17.0 | 17.0 | 42.0 | 17.0 | 17.0 | 17.0 | 17.0 | 17.0 |
| second part | | | | | | | | |
| number of band ply | 2 | 1 | 1 | 2 | 1 | 1 | 1 | 1 |
| band cord material | nylon | nylon | PEN | nylon | nylon | nylon | PEN | aramid |
| band cord modulus M2 | 17.0 | 17.0 | 42.0 | 17.0 | 20.0 | 21.5 | 42.0 | 77.0 |
| modulus ratio M2/M1 | 1.00 | 1.00 | 1.00 | 1.00 | 1.18 | 1.26 | 2.47 | 4.53 |
| width ratio W2/W1 | 1.0 | 1.0 | 1.0 | 1.0 | 1.0 | 1.0 | 1.0 | 1.0 |
| width ratio W4/W3 | 1.0 | 1.0 | 1.0 | 1.0 | 1.0 | 1.0 | 1.0 | 1.0 |
| ride comfort | 60 | 70 | 50 | 70 | 67 | 67 | 60 | 55 |
| high-speed durability | | | | | | | | |
| outboard | 100 | 80 | 120 | 90 | 107 | 112 | 120 | 130 |
| inboard | 100 | 90 | 100 | 100 | 100 | 100 | 100 | 100 |

| Tire | Ex. 5 | Ex. 6 | Ex. 7 | Ex. 8 | Ex. 9 | Ex. 10 | Ex. 11 | Ex. 12 |
|---|---|---|---|---|---|---|---|---|
| tread pattern (Fig. No.) | 5 | 5 | 5 | 5 | 3 | 3 | 3 | 3 |
| first part | | | | | | | | |
| number of band ply | 2 | 2 | 2 | 2 | 2 | 2 | 2 | 2 |
| band cord material | nylon | nylon | nylon | nylon | nylon | nylon | nylon | nylon |
| band cord modulus M1 | 17.0 | 17.0 | 17.0 | 17.0 | 17.0 | 17.0 | 17.0 | 17.0 |
| second part | | | | | | | | |
| number of band ply | 1 | 1 | 1 | 1 | 1 | 1 | 1 | 1 |
| band cord material | nylon | nylon | PEN | aramid | nylon | nylon | PEN | aramid |
| band cord modulus M2 | 20.0 | 21.5 | 42.0 | 77.0 | 20.0 | 21.5 | 42.0 | 77.0 |
| modulus ratio M2/M1 | 1.18 | 1.26 | 2.47 | 4.53 | 1.18 | 1.26 | 2.47 | 4.53 |
| width ratio W2/W1 | 0.65 | 0.65 | 0.65 | 0.65 | 0.65 | 0.65 | 0.65 | 0.65 |
| width ratio W4/W3 | 1.0 | 1.0 | 1.0 | 1.0 | 1.09 | 1.09 | 1.09 | 1.09 |
| ride comfort | 70 | 70 | 65 | 60 | 80 | 80 | 75 | 70 |
| high-speed durability | | | | | | | | |
| outboard | 107 | 110 | 120 | 130 | 107 | 110 | 120 | 130 |
| inboard | 100 | 100 | 100 | 100 | 100 | 100 | 100 | 100 |

The invention claimed is:

1. A pneumatic tire having mounting location on a vehicle that is specified and which comprises:
   a carcass extending between bead portions through a tread portion and sidewall portions,
   a belt disposed radially outside the carcass in the tread portion, and composed of belt cords laid at an angle of from 15 to 40 degrees with respect to the tire circumferential direction, and
   a band disposed radially outside the belt, and composed of first and second band cords laid at an angle of not more than 5 degrees with respect to the tire circumferential direction,
   wherein the band consists of
      an inboard first part composed of the first band cord having a first modulus M1 and disposed on one side of the tire equator positioned close to the center of a vehicle body, and
      an outboard second part composed of the second band cord having a second modulus M2 greater than the first modulus M1 and disposed on the other side of the tire equator positioned away from the center of the vehicle body, and
   the number of laminated plies of the band in the inboard first part is more than the number of laminated plies or ply of the band in the outboard second part.

2. The pneumatic tire according to claim 1, wherein the ratio M2/M1 of the second modulus M2 to the first modulus M1 is 1.2 to 7.0.

3. The pneumatic tire according to claim 1, wherein the second modulus M2 is 42.0 to 77.0 centinewton/dtex, and the first modulus M1 is 17.0 to 21.5 centinewton/dtex.

4. The pneumatic tire according to claim 1, wherein the second band cord is an aramid fiber cord, and the first band cord is a nylon fiber cord.

5. The pneumatic tire according to claim 1, wherein the band ply number in the inboard first part is two, and the band ply number in the outboard second part is one.

6. The pneumatic tire according to claim 1, wherein cord count of the or each band ply in the outboard second part is the same as the cord count of the or each band ply in the inboard first part.

7. A pneumatic tire having a mounting location on a vehicle that is specified and which comprises:
   a carcass extending between bead portions through a tread portion and sidewall portions,
   a belt disposed radially outside the carcass in the tread portion, and composed of belt cords laid at an angle of from 15 to 40 degrees with respect to the tire circumferential direction, and
   a band disposed radially outside the belt, and composed of first and second band cords laid at an angle of not more than 5 degrees with respect to the tire circumferential direction,
   wherein the band comprises
      an inboard first part composed of the first band cord having a first modulus M1 and positioned close to the center of a vehicle body, and an outboard second part composed of the second band cord having a second modulus M2 greater than the first modulus M1 and positioned away from the center of the vehicle body, and the number of laminated plies of the band in the inboard first part is more than the number of laminated plies or ply of the band in the outboard second part, and wherein the land ratio of one half of the tread portion on the outboard side of the tire equator is more than the land ratio of the other one half of the tread portion on the inboard side of the tire equator, the tread portion is provided on each side of the tire equator with an axially outermost, circumferentially continuously extending main groove so as to define a shoulder land portion axially outside the main groove, and the axial width W4 of the outboard shoulder land portion is more than the axial width W3 of the inboard shoulder land portion.

8. The pneumatic tire according to claim 2, wherein the second modulus M2 is 42.0 to 77.0 centinewton/dtex, and the first modulus M1 is 17.0 to 21.5 centinewton/dtex.

9. The pneumatic tire according to claim 2, wherein the second band cord is an aramid fiber cord, and the first band cord is a nylon fiber cord.

10. The pneumatic tire according to claim 3, wherein the second band cord is an aramid fiber cord, and the first band cord is a nylon fiber cord.

11. The pneumatic tire according to claim 2, wherein the band ply number in the inboard first part is two, and the band ply number in the outboard second part is one.

12. The pneumatic tire according to claim 3, wherein the band ply number in the inboard first part is two, and the band ply number in the outboard second part is one.

13. The pneumatic tire according to claim 4, wherein the band ply number in the inboard first part is two, and the band ply number in the outboard second part is one.

14. The pneumatic tire according to claim 2, wherein the axial width W2 of the outboard second part is less than the axial width W1 of the inboard first part.

15. The pneumatic tire according to claim 3, wherein the axial width W2 of the outboard second part is less than the axial width W1 of the inboard first part.

16. The pneumatic tire according to claim 4, wherein the axial width W2 of the outboard second part is less than the axial width W1 of the inboard first part.

17. The pneumatic tire according to claim 5, wherein the axial width W2 of the outboard second part is less than the axial width W1 of the inboard first part.

18. The pneumatic tire according to claim 2, wherein the cord count of the or each band ply in the outboard second part is the same as the cord count of the or each band ply in the inboard first part.

19. The pneumatic tire according to claim 3, wherein the cord count of the or each band ply in the outboard second part is the same as the cord count of the or each band ply in the inboard first part.

* * * * *